United States Patent
Osawa et al.

(10) Patent No.: US 8,753,049 B2
(45) Date of Patent: Jun. 17, 2014

(54) CUTTING TOOL

(75) Inventors: Jiro Osawa, Toyokawa (JP); Norihiro Masuda, Toyokawa (JP); Wataru Aoki, Nagoya (JP)

(73) Assignees: OSG Corporation, Aichi (JP); BTT Corporation, Aichi (JP)

( * ) Notice: Subject to any disclaimer, the term of this patent is extended or adjusted under 35 U.S.C. 154(b) by 52 days.

(21) Appl. No.: 12/736,364

(22) PCT Filed: Sep. 23, 2009

(86) PCT No.: PCT/JP2009/066462
§ 371 (c)(1),
(2), (4) Date: Sep. 30, 2010

(87) PCT Pub. No.: WO2011/036739
PCT Pub. Date: Mar. 31, 2011

(65) Prior Publication Data
US 2012/0170990 A1 Jul. 5, 2012

(51) Int. Cl.
*B23B 51/05* (2006.01)
(52) U.S. Cl.
USPC .......................................... 408/204
(58) Field of Classification Search
USPC ................... 408/204–209, 713, 703
IPC .............................. B23B 51/04,51/05
See application file for complete search history.

(56) References Cited

U.S. PATENT DOCUMENTS

| | | | | |
|---|---|---|---|---|
| 640,108 A | * | 12/1899 | Dalzell | 408/204 |
| 1,187,618 A | * | 6/1916 | Gridley | 407/54 |
| 2,062,257 A | * | 11/1936 | Douglas et al. | 408/204 |
| 2,556,745 A | | 6/1951 | Zimmermann | |
| 2,847,885 A | * | 8/1958 | Wagner | 408/59 |

(Continued)

FOREIGN PATENT DOCUMENTS

| CH | 676098 A5 | * | 12/1990 |
|---|---|---|---|
| EP | 375526 A1 | * | 6/1990 |

(Continued)

OTHER PUBLICATIONS

English translation of International Search Report issued by Japanese Patent Office for International Application No. PCT/JP2009/066462.

*Primary Examiner* — Daniel Howell
(74) *Attorney, Agent, or Firm* — Muramatsu & Associates

(57) ABSTRACT

A cutting tool is designed to prevent chip packing. The cutting tool includes a body that rotates about an axis center, a hole portion that is open in a tip end surface of the body, a wall portion that is formed of the hole portion and an outer circumferential surface of the body, a notch portion that is communicated with the hole portion, and a blade portion that is formed or held at a portion where the notch portion intersects with the tip end surface of the wall portion. The blade portion includes an inner side surface that passes through an inner end portion of a bottom blade and intersects with a rake surface through a ridge line. The inner side surface is inclined so that a distance between the inner side surface and the axis center is increased towards a direction opposite to the rotational direction of the body.

4 Claims, 5 Drawing Sheets

(56) References Cited

U.S. PATENT DOCUMENTS

| | | | |
|---|---|---|---|
| 2,869,405 A * | 1/1959 | Wolfe | 408/233 |
| RE24,924 E * | 1/1961 | Willingham | 408/59 |
| 3,592,554 A * | 7/1971 | Takahara | 408/204 |
| 4,322,187 A * | 3/1982 | Hougen | 408/204 |
| 4,338,050 A | 7/1982 | Ozer et al. | |
| 4,408,935 A * | 10/1983 | Miyanaga | 408/206 |
| 4,452,554 A * | 6/1984 | Hougen | 408/206 |
| 4,669,931 A | 6/1987 | Isaksson | |
| 4,693,644 A * | 9/1987 | Takahashi | 408/204 |
| 5,007,777 A * | 4/1991 | Itokazu | 408/67 |
| 6,273,652 B1 | 8/2001 | Wirth et al. | |
| 6,786,684 B1 * | 9/2004 | Ecker | 408/204 |

FOREIGN PATENT DOCUMENTS

| | | | |
|---|---|---|---|
| JP | 53025983 A * | 3/1978 | |
| JP | H02-237707 | 9/1990 | |
| JP | 05337715 A * | 12/1993 | |
| JP | 08118124 A * | 5/1996 | |
| JP | 11028609 A * | 2/1999 | |
| SU | 529910 A * | 1/1977 | |

* cited by examiner

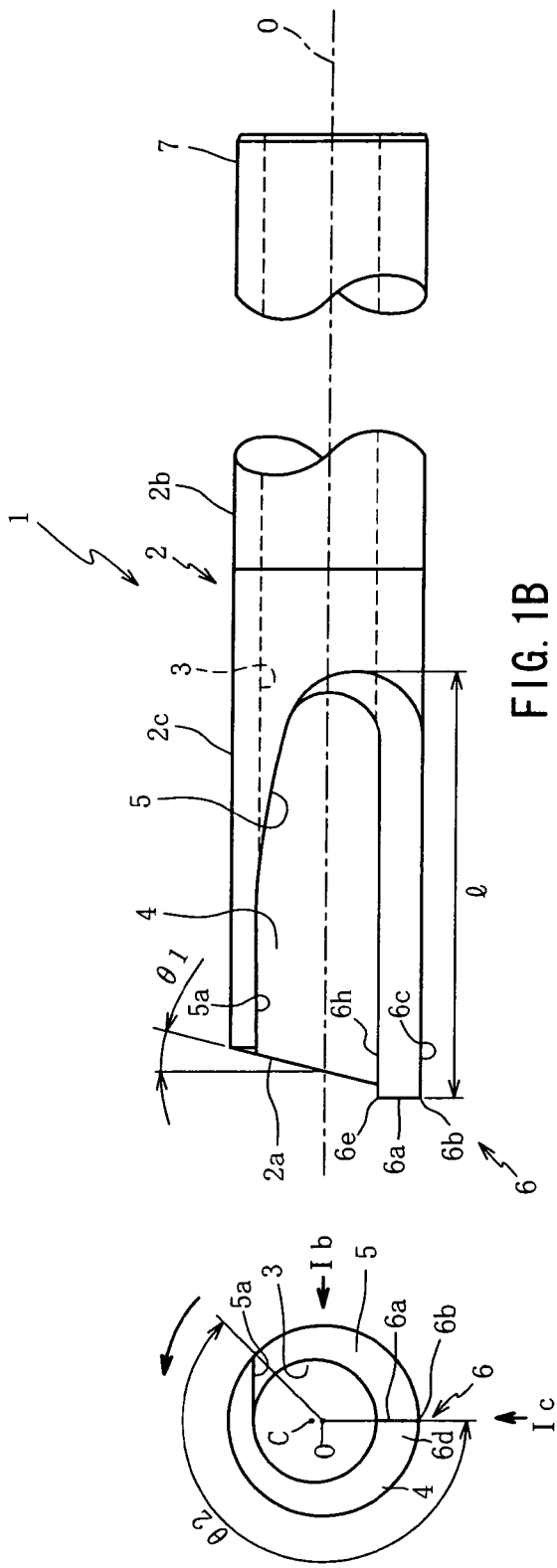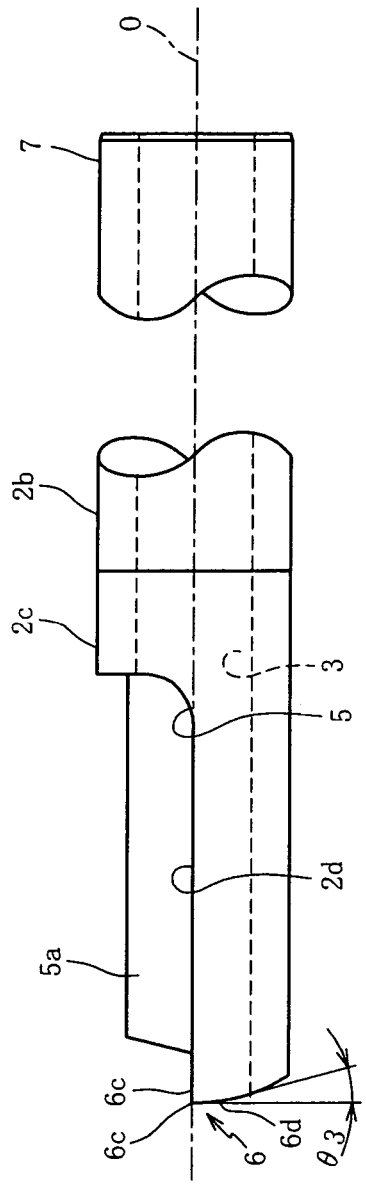

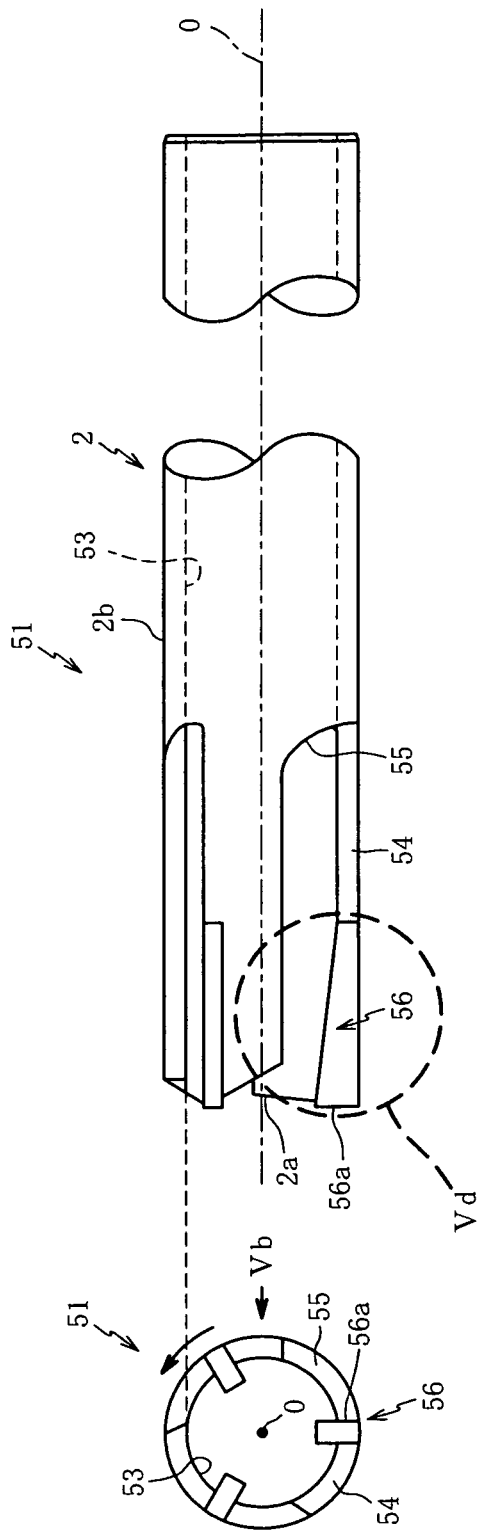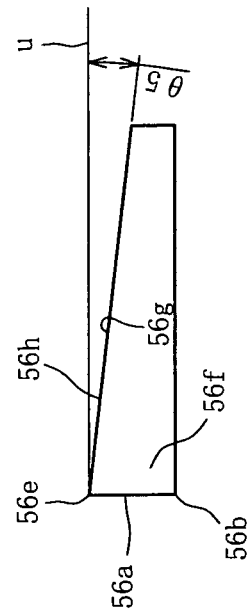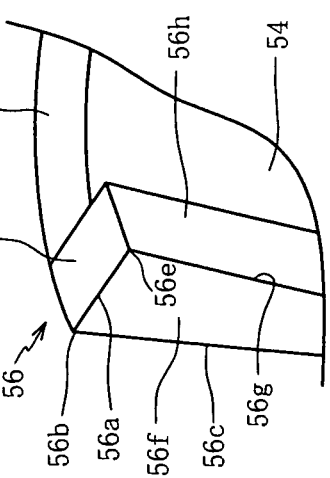
FIG. 5A
FIG. 5B
FIG. 5C
FIG. 5D

CUTTING TOOL

This application is a national stage of International Patent Application No. PCT/JP2009/066462, filed Sep. 23, 2009, the entire contents of which are incorporated herein by reference.

TECHNICAL FIELD

The present invention relates to a cutting tool, and particularly to a cutting tool by which chip packing can be prevented.

BACKGROUND ART

In a drilling process using a fiber-reinforced composite material such as an FRP (fiber-reinforced plastic), especially, a CFRP (carbon fiber reinforced plastic) as a target member, inner fibers are hardly cut off. Thus, there has been a problem that the fibers become tangled to cause fluff on a peripheral wall of a hole, or laminated fiber layers are fell off to cause delamination on a peripheral wall of a hole. Further, large amounts of fibers are contained in chips generated in a drilling process for a fiber-reinforced composite material, and if the fibers are dispersed, the work environment is deteriorated. Thus, there is a need of reduction in the amount of chips generated during the drilling process.

In order to address such a problem and to respond to the demand, there has been disclosed a drilling tool (see FIGS. 1-3 in Japanese Patent Application Laid-Open Publication No. JP H2-237707) including a tool body 10 that rotates about an axis center O, a hole 10a that is open in a tip end surface of the tool body 10, a chip discharging groove 12 that is formed on an outer circumference of the tool body 10 while being communicated with the hole 10a, and a tip 13 that is fixed at a tip-end ridge line portion of the chip discharging groove 12. In the technique disclosed in JP H2-237707, a target member is not cut around the axis center O of the tool body 10. Thus, the target member inside the hole 10a is hollowed by a cutting blade 16 of the tip 13, and remains inside the hole 10a. In addition, only a part of the target member that is cut into by the cutting blade 16 becomes chips, and thus the amount of the chips generated can be reduced.

SUMMARY OF INVENTION

Technical Problem

However, in the technique disclosed in JP H2-237707, the inside of the tip 13 protrudes on the side of the axis center O from an inner circumferential surface of the hole 10a, as shown in FIG. 3 of JP H2-237707. Thus, there has been a problem that a trouble (chip packing) that the chips generated during the cutting process are stuck in the vicinity of the tip 13 of the hole 10a possibly occurs. If the chip packing occurs, the cutting efficiency is deteriorated. In addition, there have been problems that an inner wall of a hole formed in the target member becomes rough to cause fluff or delamination, and an increased cutting resistance causes the drilling tool to be broken.

The present invention has been achieved to address the above-described problems, and an object thereof is to provide a cutting tool by which chip packing can be prevented.

Solution to Problem

For solving the problem, a cutting tool according to the first aspect of the invention comprises: a body that rotates about an axis center; a hole portion that is open in a tip end surface of the body; a wall portion that is formed of the hole portion and an outer circumferential surface of the body; a notch portion that is notched from the tip end surface of the wall portion and is communicated with the hole portion; and a blade portion that is formed or held at a portion where the notch portion intersects with the tip end surface of the wall portion. The blade portion includes a bottom blade formed at a tip end in the axis center direction, and an inner side surface that passes through an inner end portion of the bottom blade and intersects with a rake surface through a ridge line; and the inner side surface is inclined so that a distance between the inner side surface and the axis center is increased towards a direction opposite to the rotational direction of the body.

According to the cutting tool in the second aspect of the invention, the axis center of the body is deviated from an axis line of the hole portion.

According to the cutting tool in the third aspect of the invention, the blade portion is formed or held at the thickest portion of the wall portion.

A cutting tool according to the fourth aspect of the invention comprises: a body that rotates about an axis center; a hole portion that is open in a tip end surface of the body; a wall portion that is formed of the hole portion and an outer circumferential surface of the body; notch portions each of that is notched from the tip end surface of the wall portion and is communicated with the hole portion; and blade portions each of that is formed or held at a portion where each of the notch portions intersects with the tip end surface of the wall portion. Each of the blade portions includes a bottom blade formed at a tip end in the axis center direction, and an inner side surface that passes through an inner end portion of the bottom blade and intersects with a rake surface through a ridge line; and the ridge line is inclined to depart from a line in parallel with the axis center passing through the inner end portion of the blade portion, as the ridge line is directed from the tip end surface of the body towards the rear end side.

According to the cutting tool in the fifth aspect of the invention, the plurality of notch portions are formed at the wall portion, the blade portions are formed or held at respective portions where the notch portions intersect with the tip end surface of the wall portion.

According to the cutting tool in the sixth aspect of the invention, each of the blade portions includes an outer circumferential blade that intersects with the bottom blade through an outer circumferential corner.

According to the cutting tool in the seventh aspect of the invention, the hole portion penetrates from the tip end surface of the body to a rear end, and is formed in such a manner that its diameter on the rear end side is larger than that on the front end side.

According to the first aspect of the invention noted above, the cutting tool includes: a body that rotates about an axis center; a hole portion that is open in a tip end surface of the body; a wall portion that is formed of the hole portion and an outer circumferential surface of the body; a notch portion that is notched from the tip end surface of the wall portion and is communicated with the hole portion; and a blade portion that is formed or held at a portion where the notch portion intersects with the tip end surface of the wall portion, and the blade portion includes a bottom blade formed at a tip end in the axis center direction. Accordingly, a target member is hollowed by the bottom blade. The hollowed target member is formed in a cylindrical shape having a cylindrical side surface along the axis center with a cylindrical bottom surface of a rotational trajectory of an inner end portion of the bottom blade.

Here, the blade portion includes an inner side surface that passes through an inner end portion of the bottom blade and intersects with a rake surface through a ridge line, and the inner side surface is inclined to depart from a virtual cylindrical side surface, along the axis center, having a cylindrical bottom surface of a rotational trajectory passing through the inner end portion of the bottom blade, as the inner side surface is directed towards the direction opposite to the rotational direction of the body. The inclination allows the chips to be easily discharged in the direction opposite to the rotational direction of the blade portion. Thus, the chip packing can be advantageously prevented.

According to the cutting tool in the second aspect of the invention noted above, since the axis center of the body is deviated from an axis line of the hole portion, a clearance corresponding to an amount by which the axis center of the body is deviated from the axis line of the hole portion can be formed on the inner side surface of the blade portion and the wall portion. The clearance can be formed by providing the hole portion whose axis is deviated from the axis center of the body. Thus, the cutting tool can be easily manufactured, and the productivity of the cutting tool can be advantageously improved.

According to the cutting tool in the third aspect of the invention noted above, since the blade portion is formed or held at the thickest portion of the wall portion, the clearance can be provided on the wall portion in the direction opposite to the rotational direction of the blade portion. As a result, a frictional force between the wall portion and the target member can be prevented in the direction opposite to the rotational direction of the blade portion. Thus, the inner end portion of the bottom blade can be stably fed into the target member, and the cutting performance can be advantageously improved.

According to the fourth aspect of the invention, the cutting tool includes: a body that rotates about an axis center; a hole portion that is open in a tip end surface of the body; a wall portion that is formed of the hole portion and an outer circumferential surface of the body; notch portions each of which is notched from the tip end surface of the wall portion and is communicated with the hole portion; and blade portions each of which is formed or held at a portion where each of the notch portions intersects with the tip end surface of the wall portion, and each of the blade portions includes a bottom blade formed at a tip end in the axis center direction. Accordingly, a target member is hollowed by the bottom blade. The hollowed target member is formed in a cylindrical shape having a cylindrical side surface along the axis center with a cylindrical bottom surface of a rotational trajectory of an inner end portion of the bottom blade.

Here, each of the blade portions includes an inner side surface that passes through an inner end portion of the bottom blade and intersects with a rake surface through a ridge line, and the ridge line is inclined to depart from a line in parallel with the axis center passing through the inner end portion of the blade portion, as the ridge line is directed from the tip end surface of the body towards the rear end side. The inclination allows the chips to be easily discharged on the rear end side of hole portion. Thus, the chip packing can be advantageously prevented.

According to the cutting tool in the fifth aspect of the invention noted above, the plural notch portions are formed at the wall portion, and the blade portions are formed or held at respective portions where the notch portions intersect with the tip end surface of the wall portion. If plural blades are provided, the feeding speed per one blade can be made low as long as the cutting speed and the feeding speed are the same, and the roughness of the surface can be advantageously improved. Further, eccentricity and a chatter vibration during the cutting process can be prevented, the diameter of the hole of the target member can be prevented from being increased, and the cutting tool can be advantageously prevented from being broken.

According to the cutting tool in the sixth aspect of the invention noted above, since each of the blade portions includes an outer circumferential blade that intersects with the bottom blade through an outer circumferential corner, the target member can be cut so as to be cut off while the outer circumferential corner is allowed to cut into a target surface. Further, the outer circumferential blade cuts off inner circumferential portions of the hole formed in the target member. Accordingly, the roughness of the surface of the hole formed in the target member can be advantageously improved.

According to the cutting tool in the seventh aspect of the invention noted above, the hole portion penetrates from the tip end surface of the body to a rear end, and is formed in such a manner that its diameter on the rear end side is larger than that on the front end side. Accordingly, the chips introduced into the hole portion during the cutting process can be easily discharged on the rear end side, and the chip packing can be advantageously and more efficiently prevented.

BRIEF DESCRIPTION OF DRAWINGS

FIG. 1($a$) is a front view of a cutting tool in a first embodiment of the present invention. FIG. 1($b$) is a side view of the cutting tool when viewed from the direction of an arrow Ib of FIG. 1($a$). FIG. 1($c$) is a side view of the cutting tool when viewed from the direction of an arrow Ic of FIG. 1($a$).

FIG. 2($b$) is an enlarged view of a tip end surface of the cutting tool shown in FIG. 1($a$).

FIG. 3($b$) is a front view of a cutting tool in a third embodiment.

FIG. 4($b$) is a side view of a cutting tool in a fifth embodiment.

FIG. 5($a$) is a front view of a cutting tool in a sixth embodiment. FIG. 5($b$) is a side view of the cutting tool when viewed from the direction of an arrow Vb of FIG. 5($a$). FIG. 5($c$) is a perspective view of a blade portion. FIG. 5($d$) is a partially-enlarged side view of the cutting tool shown by enlarging a portion represented by Vd of FIG. 5($b$).

DESCRIPTION OF EMBODIMENTS

Figure 2A:
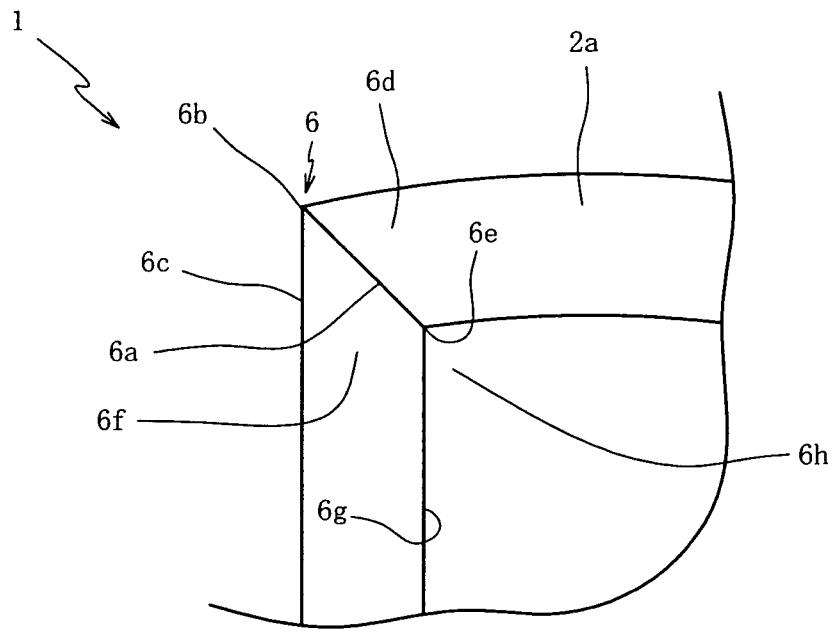
FIG. 2($a$) is a perspective view of a blade portion and constituent elements in the vicinity of the blade portion of the cutting tool.

Hereinafter, exemplary embodiments of the present invention will be described with reference to the accompanying drawings. FIG. 1($a$) is a front view of a cutting tool in a first embodiment of the present invention, FIG. 1($b$) is a side view of the cutting tool when viewed from the direction of an arrow Ib of FIG. 1($a$), and FIG. 1($c$) is a side view of the cutting tool when viewed from the direction of an arrow Ic of FIG. 1($a$). An arrow illustrated in FIG. 1($a$) shows the rotational direction of the cutting tool. It should be noted that an intermediate portion of the cutting tool in the axis direction is not illustrated in each of FIG. 1($b$) and FIG. 1($c$).

With reference to FIG. 1, an outline configuration of a cutting tool 1 will be described. As shown in FIG. 1, the cutting tool 1 mainly includes a body 2, a hole portion 3 that is open in a tip end surface 2$a$ of the body 2, a wall portion 4 that is formed of the hole portion 3 and an outer circumferential surface 2$b$ of the body 2, a notch portion 5 that is notched from the tip end surface 2a of the wall portion 4 and is communicated with the hole portion 3, and a blade portion 6 that is formed at a portion where the notch portion 5 intersects with the tip end surface 2a of the wall portion 4. The cutting tool 1 is configured as a solid type in which the blade portion 6 and a shank 7 are integrated with the body 2 in the embodiment. In the cutting tool 1, the rotational force of a processing machine (not shown) such as a machining center is transmitted through the shank 7 formed on the rear end side of the body 2 to rotate the body 2 about an axis center O (the arrow direction in FIG. 1(a)), and a cutting process for a target member can be performed.

The body 2 is made of cemented carbide or high-speed tool steel, and is configured in a substantially shaft shape. The rear end side of the body 2 is attached to a processing machine through the shank 7. The blade portion 6 is provided on the end surface (tip end surface 2a) of the body 2 opposite to the shank 7. Further, on the outer circumferential surface 2b of the body 2, a back taper 2c whose outer diameter is decreased from the tip end surface 2a to the rear end is formed in a predetermined range from the tip end surface 2a. The formation of the back taper 2c allows the body 2 to be smoothly fed in the axis direction.

In the embodiment, an inclined angle θ1 (see FIG. 1(b)) of the tip end surface 2a relative to a cross-sectional surface (cross-sectional surface perpendicular to the axis) orthogonal to the axis center O of the body 2 is set at 2 to 10°. Accordingly, the cutting efficiency as well as the processing accuracy of the cutting tool 1 can be realized. It should be noted that as the inclined angle θ1 of the tip end surface 2a becomes smaller than 2°, a cutting depth during the cutting process is decreased, and thus the cutting efficiency tends to be deteriorated. On the other hand, as the inclined angle θ1 becomes larger than 10°, the wall portion 4 becomes susceptible to deflection to cause a chatter vibration, and the processing accuracy tends to be deteriorated.

The body 2 is provided with the hole portion 3 that is open in the tip end surface 2a. The hole portion 3 serves to accommodate chips during the cutting process. In the embodiment, the cross-sectional surface of the hole portion 3 is formed in a substantially circular shape in front view as shown in FIG. 1(a). Further, the hole portion 3 is the same in diameter from the tip end surface 2a of the body 2 to the shank 7, and penetrates in parallel with the axis center O. Since the hole portion 3 penetrates from the tip end surface 2a to the shank 7, a suction apparatus (not shown) is connected to the shank 7 to suck the chips generated during the cutting process from the hole portion 3, thus preventing the chips from scattering.

It should be noted that a ratio (s/S) of an area s of the contour of the cross-sectional surface of the hole portion 3 to an area S of the contour of the cross-sectional surface of the outer circumferential surface 2b of the body 2 is preferably set at 0.5 to 0.8. Accordingly, chip packing can be prevented, and the stiffness of the wall portion 4 can be secured. As the ratio (s/S) becomes smaller than 0.5, the cutting amount of the target member is increased. Thus, the amount of the chips generated is increased, and the chip packing tends to possibly occur. On the other hand, as the ratio (s/S) becomes larger than 0.8, the thickness of the wall portion 4 becomes smaller, and the stiffness of the wall portion 4 tends to be reduced.

Further, the hole portion 3 is formed in a manner that its axis line c is deviated from the axis center O of the body 2. Namely, the axis line c of the hole portion 3 is located at a portion (the upper sides of FIG. 1(a) and FIG. 1(b), and the depth side of FIG. 1(c)) inclined downward from the axis center O towards the rear end of the body 2 in the tip end surface 2a. The wall portion 4 is formed of the hole portion 3 and the outer circumferential surface of the body 2. Since the axis line c of the hole portion 3 is deviated from the axis center O of the body 2, the thickness of the wall portion 4 is not uniform along the rotational direction as shown in FIG. 1(a).

Here, the amount (hereinafter, referred to as an "eccentric amount") by which the axis line c of the hole portion 3 is deviated from the axis center O of the body 2 is preferably set in a range of 0.01 mm or larger and 0.5 mm or smaller, although it differs depending on an outer diameter A of the body 2. Further, a ratio (a/A) of an eccentric amount a to the outer diameter A of the body 2 is preferably set at 0.8 or smaller. Accordingly, the chip packing can be prevented, and the stiffness of the wall portion 4 can be secured. It should be noted that if the eccentric amount becomes smaller than 0.01 mm, a gap (clearance) between a cylindrical side surface (to be described later) of the target member that is formed by a bottom blade 6a and the hole portion 3 becomes smaller. Thus, the chip packing tends to possibly occur. Further, if the eccentric amount becomes larger than 0.5 mm, or if the ratio a/A becomes larger than 0.8, the thickness of the wall portion 4 on the side deviated from the axis center O (the upper side of FIG. 1(a)) becomes smaller, and the wall portion 4 is possibly broken.

The notch portion 5 is formed from the tip end surface 2a of the wall portion 4, and is communicated with the hole portion 3 to introduce the chips during the cutting process to the hole portion 3. The notch portion 5 is indented starting from the thickest portion of the wall portion 4 in the tip end surface 2a to an end 5a with a predetermined opening width in the rotational direction indicated by the upper arrow of FIG. 1(a). Here, the thickest portion of the wall portion 4 is the lower side of FIG. 1(a) where an imaginary line passing through the axis line c and the axis center O intersects with the wall portion 4. It should be noted that the end 5a of the notch portion 5 is not formed from the outer circumferential surface 2b towards the axis center O. Instead, it is formed in a direction from the outer circumferential surface 2b towards a position where the imaginary line noted above intersects with an upper inner circumferential surface of the hole portion 3 as shown in FIG. 1(a). Accordingly, the thickness of the wall portion 4 in the direction opposite to the rotational direction (opposite to the arrow direction of FIG. 1(a)) can be gradually made smaller from the blade portion 6 to the end 5a of the notch portion 5.

Further, a center angle θ2 (see FIG. 1(a)) relative to the notch portion 5 of the wall portion 4 is set at about 240° in the embodiment. Preferably, the center angle θ2 relative to the notch portion 5 can be set in a range of 90° to 270°. Accordingly, the chip packing can be prevented, and the centrality can be secured. It should be noted that as the center angle θ2 becomes smaller than 90°, the centrality is deteriorated, and the stiffness of the wall portion 4 is reduced. Thus, the wall portion 4 tends to be possibly broken. On the other hand, as the center angle θ2 becomes larger than 270°, the opening width of the notch portion 5 becomes narrow. Thus, the chips generated during the cutting process hardly enter the notch portion 5, and the chip packing tends to possibly occur.

Further, it is preferable that a length l of the notch portion 5 from the bottom blade 6a in the axis direction be 0.1 mm or longer but shorter than the thickness of the target member. Accordingly, the cutting efficiency can be improved and the stiffness of the wall portion 4 can be secured. It should be noted that as the length l of the notch portion 5 becomes shorter than 0.1 mm, it becomes difficult to increase the cutting depth during the cutting process. Thus, the cutting efficiency tends to be deteriorated. On the other hand, as the length l of the notch portion 5 becomes longer than the thickness of the target member, the stiffness of the wall portion 4 is reduced. Thus, the chatter vibration possibly occurs, and the wall portion 4 tends to be possibly broken. Further, in the case where the length l of the notch portion 5 becomes longer than the thickness of the target member, when the chips in the hole portion 3 are sucked from the shank 7 by connecting a sucking apparatus (not shown), a sucking force will be decreased because the air is sucked from the notch portion 5.

The blade portion 6 includes the bottom blade 6a formed at the tip end in the direction of the axis center O. The bottom blade 6a is formed in parallel with the cross-sectional surface perpendicular to the axis of the body 2 at a portion where the notch portion 5 intersects with the tip end surface 2a of the wall portion 4. Further, the blade portion 6 includes an outer circumferential blade 6c that intersects with the bottom blade 6a through an outer circumferential corner 6b. The outer circumferential blade 6c is formed in parallel with the axis center O as a straight blade linked to a cross ridge line 2d (see FIG. 1(c)) between the notch portion 5 and the outer circumferential surface 2b of the body 2.

Here, a flank angle θ3 (see FIG. 1(c)) of a flank surface 6d of the blade portion 6 is preferably set at 2° to 10°. Accordingly, the abrasion of the flank surface can be reduced and the strength of the blade edge can be secured. It should be noted that as the flank angle θ3 becomes smaller than 2°, the abrasion of the flank surface tends to be possibly increased. As the flank angle θ3 becomes larger than 10°, the strength of the blade edge is reduced, and the bottom blade 6a tends to be possibly broken.

Figure 2B:
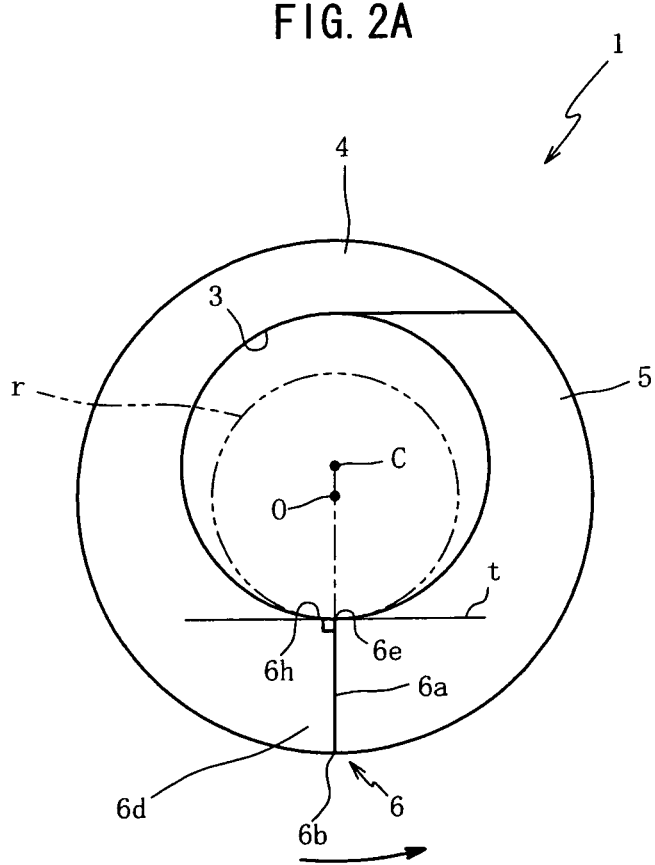

Next, the blade portion 6 and constituent elements in the vicinity of the blade portion 6 of the cutting tool 1 will be described in detail with reference to FIG. 2. FIG. 2(a) is a perspective view of the blade portion 6 and constituent elements in the vicinity of the blade portion 6 of the cutting tool 1, and FIG. 2(b) is an enlarged view of the tip end surface 2a of the cutting tool 1 shown in FIG. 1(a). It should be noted that an arrow shown in FIG. 2(b) shows the rotational direction of the cutting tool 1.

As shown in FIG. 2(a), the blade portion 6 includes an inner side surface 6h that passes through an inner end portion 6e of the bottom blade 6a and intersects with a rake surface 6f through a ridge line 6g. As shown in FIG. 2(b), the inner side surface 6h is inclined so that a distance between the inner side surface 6h and the axis center O is increased towards the direction opposite to the rotational direction (opposite to the arrow at the bottom of FIG. 2(b)) of the body 2. In FIG. 2(b), a dotted circle is an imaginary circle indicating a rotational trajectory r of the inner end portion 6e of the bottom blade 6a about the axis center O. It should be noted that as shown in FIG. 2(b), the cutting tool 1 is configured in such a manner that a tangent line t of the cross-sectional surface of the hole portion 3 at the inner end portion 6e is orthogonal to the bottom blade 6a when viewed from the tip end in the direction of the axis center O.

Here, by rotating the cutting tool 1 about the axis center O, the target surface is cut and the target member is hollowed by the bottom blade 6a. Thus, the hollowed target member is in a cylindrical shape having a cylindrical side surface along the axis center O with a cylindrical bottom surface of the rotational trajectory r noted above. Since the inner side surface 6h is inclined to depart from the axis center O as advances towards the direction opposite to the rotational direction (the direction opposite to the bottom arrow direction of FIG. 2(b)) of the body 2, a clearance is provided in the direction opposite to the rotational direction of the blade portion 6 due to the inclination. Thus, the chips can be easily discharged. Accordingly, the chip packing can be prevented in the cutting tool 1.

Further, the inclination of the inner side surface 6h is formed by providing the hole portion 3 in the body 2 in a manner that the axis line c of the hole portion 3 is deviated from the axis center O of the body 2. Thus, the cutting tool 1 can be easily manufactured, and the productivity can be improved.

Further, the blade portion 6 is formed at the thickest portion where the imaginary line noted above passing through the axis center O from the axis line c of the hole portion 3 intersects with of the wall portion 4. Thus, the clearance can be provided on an inner circumferential surface of the wall portion 4 in the direction opposite to the rotational direction of the blade portion 6. As a result, a frictional force between the wall portion 4 and the target member can be prevented in the direction opposite to the rotational direction of the blade portion 6. Thus, the inner end portion 6e of the bottom blade 6a can be stably fed into the target member, thereby improving the cutting performance.

Further, the thickness of the wall portion 4 is gradually decreased from the blade portion 6 to the end 5a of the notch portion 5. Thus, the target member to be hollowed and the cutting tool 1 can be prevented from interfering with each other. As a result, the eccentricity of the cutting tool 1 during the cutting process and the chatter vibration can be prevented, and the cutting tool 1 can be prevented from being broken.

Figure 3A:
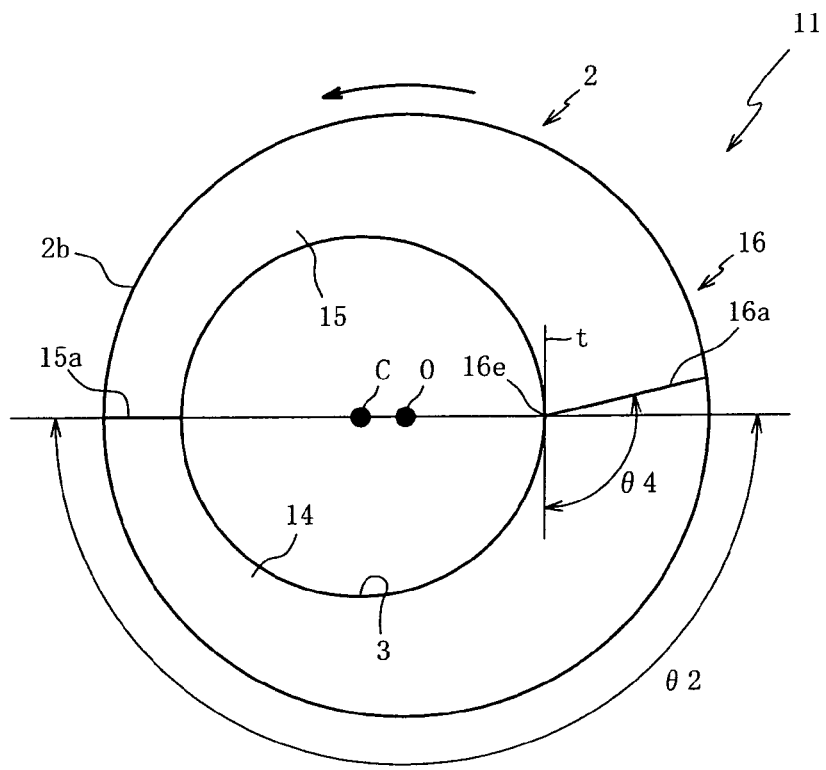
FIG. 3($a$) is a front view of a cutting tool in a second embodiment.

Next, cutting tools 11 and 21 in a second embodiment and a third embodiment will be described with reference to FIG. 3. In the first embodiment, the tangent line t of the cross-sectional surface of the hole portion 3 at the inner end portion 6e is orthogonal to the bottom blade 6a when viewed from the tip end in the direction of the axis center O, and the center angle θ2 relative to the wall portion 4 is set at about 240°. However, in the cutting tool 11 of the second embodiment, the tangent line t of the cross-sectional surface of the hole portion 3 at an inner end portion 16e of a bottom blade 16a intersects with a bottom blade 16a at an angle of 90° or larger when viewed from the tip end in the direction of the axis center O, and the center angle θ2 relative to a wall portion 14 is set at about 180°. Further, in the cutting tool 21 of the third embodiment, a bottom blade 26a is formed in a bent manner when viewed from the tip end in the direction of the axis center O. It should be noted that constituent elements same as those in the first embodiment will be denoted by the same reference numerals, and thus the explanations thereof will not be repeated. FIG. 3(a) is a front view of the cutting tool 11 in the second embodiment of the present invention, and FIG. 3(b) is a front view of the cutting tool 21 in the third embodiment of the present invention.

As shown in FIG. 3(a), the bottom blade 16a of the cutting tool 11 intersects with the tangent line t of the cross-sectional surface of the hole portion 3 at the inner end portion 16e of the bottom blade 16a at an angle θ4 larger than 90° when viewed from the tip end in the direction of the axis center O. The angle θ4 is preferably set at 90°<θ4≤100°. Accordingly, the cutting performance as well as the life of the tool can be improved, the thicknesses of the chips can be made small, fluctuations in the cutting resistance can be made small, and the chatter vibration can be prevented. Here, as the angle θ4 becomes smaller than 90°, the cutting performance tends to be deteriorated. As the angle θ4 becomes larger than 100°, the strength of the blade edge on the outer circumferential side is reduced and the blade edge tends to be possibly broken. In addition, the life of the tool tends to be reduced, the blade edge tends to possibly cut into the target member, and undulations are possibly occurred in an inner wall of the hole of the target member.

Figure 3B:
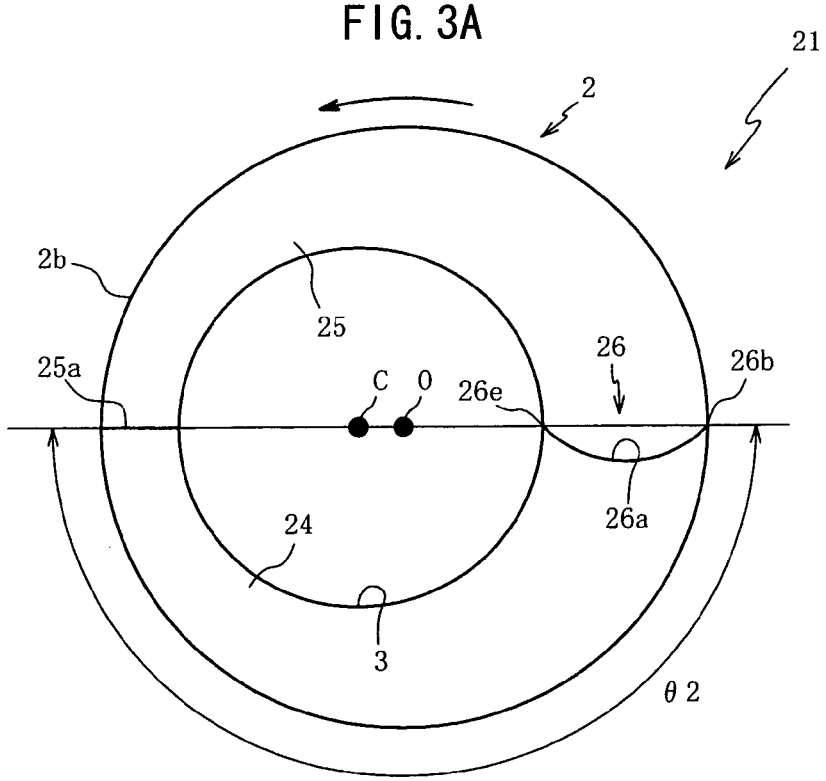

Next, as shown in FIG. 3(b), in a blade portion 26 of the cutting tool 21, the bottom blade 26a is formed in a bent manner when viewed from the tip end in the direction of the axis center O. By bending the bottom blade 26a, the cutting performance of the bottom blade 26a can be improved because both of an inner end portion 26e and an outer circumferential corner 26b initially cut into the target member.

Further, in the cutting tools 11 and 21 in the second embodiment and the third embodiment, the center angle θ2 of each of the wall portions 14 and 24 is set at about 180°. Thus, the opening width of each of notch portions 15 and 25 can be increased as compared to the cutting tool 1 in the first embodiment. As a result, the chips can be easily introduced into the hole portion 3 from the notch portions 15 and 25, and thus the chip packing can be prevented. It should be noted that since the center angle θ2 of each of the wall portions 14 and 24 is set at about 180°, ends 15a and 25a of the notch portions 15 and 25 of the cutting tools 11 and 21 are formed in a direction from the outer circumferential surfaces 2b to the axis centers O, respectively. Accordingly, the thicknesses of the wall portions 14 and 24 in the directions opposite to the rotational directions (opposite to the upper arrows of FIG. 3(a) and FIG. 3(b)) can be gradually made small from the blade portions 16 and 26 to the ends 15a and 25a of the notch portions 15 and 25, respectively. As a result, the target member to be hollowed and the cutting tools 11 and 21 can be prevented from interfering with each other. Accordingly, the eccentricity of each of the cutting tools 11 and 21 during the cutting process and the chatter vibration can be prevented, and the cutting tools 11 and 21 can be prevented from being broken. It should be noted that any one of the cutting tools 1, 11, and 21 suitable for the hardness and stiffness of the target member can be appropriately selected.

Figure 4A:
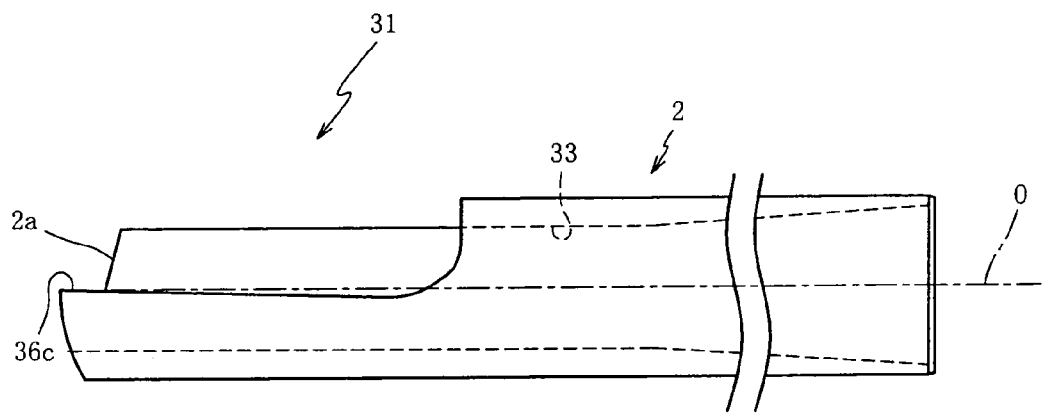
FIG. 4($a$) is a side view of a cutting tool in a fourth embodiment.

Next, cutting tools 31 and 41 in a fourth embodiment and a fifth embodiment will be described with reference to FIG. 4. In the first embodiment, the hole portion 3 is the same in diameter from the tip end surface 2a of the body 2 to the rear end side, and penetrates in parallel with the axis center O, and the outer circumferential blade 6c is configured as a straight blade in parallel with the axis center O. In contrast, in the cutting tool 31 of the fourth embodiment, a hole portion 33 penetrates while the inner diameter thereof is increased from the tip end surface 2a of the body 2 to the rear end side. Moreover, an outer circumferential blade 36c is configured as a twisted blade that is twisted relative to the axis center O. Further, in the cutting tool 41 of the fifth embodiment, a hole portion 43 does not penetrate, but has a bottom, and an outer circumferential blade 46c is configured as a bent and twisted blade. It should be noted that constituent elements same as those in the first embodiment will be denoted by the same reference numerals, and thus the explanations thereof will not be repeated. FIG. 4(a) is a side view of the cutting tool 31 in the fourth embodiment of the present invention, and FIG. 4(b) is a side view of the cutting tool 41 in the fifth embodiment of the present invention.

As shown FIG. 4(a), the outer circumferential blade 36c of the cutting tool 31 is configured as a twisted blade that is twisted relative to the axis center O. The twisted angle of the outer circumferential blade 36c can be appropriately set in accordance with the hardness and stiffness of the target member. The configuration of the outer circumferential blade 36c as a twisted blade prevents the roughness of an inner wall of the hole of the target member due to small and smooth fluctuations in the cutting resistance although it differs depending on the hardness and stiffness of the target member. Further, the cutting resistance is divided into force components in the axial direction and the feeding direction. Thus, the cutting resistance in the feeding direction can be decreased as compared to that of the straight blade, the load on the cutting process can be dispersed, and heavy duty cutting (an increase in the feeding speed and the cutting depth) can be realized.

Further, since the hole portion 33 of the cutting tool 31 penetrates while the inner diameter thereof is increased from the tip end surface 2a of the body 2 to the rear end, the chips introduced into the inside of the hole portion 33 during the cutting process can be easily discharged to the rear end side, and the chip packing can be more efficiently prevented.

Figure 4B:
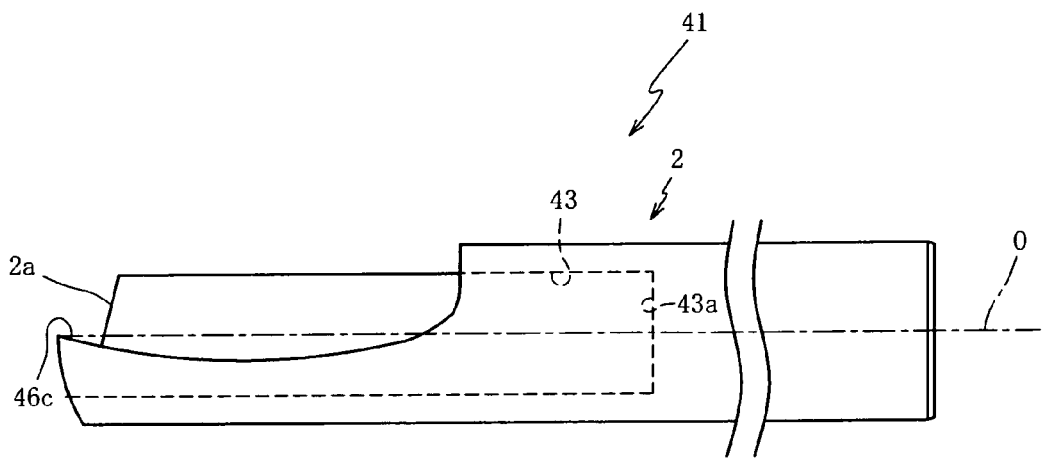

Next, as shown in FIG. 4(b), the outer circumferential blade 46c of the cutting tool 41 is configured as a bent and twisted blade. By bending the outer circumferential blade 46c, the same cutting process is performed with a longer blade portion as compared to the outer circumferential blade 36c (which is not bent) of the cutting tool 31 described in the fourth embodiment. Thus, the load on the cutting process can be further dispersed, and the heavy duty cutting can be realized although it differs depending on the hardness and stiffness of the target member.

Further, the hole portion 43 of the cutting tool 41 is formed so as to have a bottom. The hole portion 43 is formed in a circular shape having the same diameter from the tip end surface 2a of the body 2 to a bottom surface 43a. The depth of the hole portion 43 is set at the thickness of the target member or larger. Accordingly, the chips generated during the cutting process can be accommodated in the hole portion 43. The chips accommodated in the hole portion 43 are sucked from the tip end surface 2a after cutting and can be discharged from the hole portion 43. By providing the hole portion 43 with the bottom, a hollowing step for the hole portion 43 in the manufacturing step of the cutting tool 41 can be simplified, and thus the productivity of the cutting tool 41 can be improved.

Next, a cutting tool 51 in a sixth embodiment will be described with reference to FIG. 5. In the above-described embodiments, the clearance is provided towards the direction opposite to the rotational direction of the body 2. However, in the sixth embodiment, the clearance is provided from the tip end surface 2a of the body 2 towards the rear end side. It should be noted that constituent elements same as those in the first embodiment will be denoted by the same reference numerals, and thus the explanations thereof will not be repeated. FIG. 5(a) is a front view of the cutting tool 51 in the sixth embodiment, FIG. 5(b) is a side view of the cutting tool 51 when viewed from the direction of an arrow Vb of FIG. 5(a), FIG. 5(c) is a perspective view of a blade portion 56, and FIG. 5(d) is a partially-enlarged side view of the cutting tool 51 shown by enlarging a portion represented by Vd of FIG. 5(b). An arrow shown in FIG. 5(a) denotes the rotational direction of the cutting tool 51. It should be noted that an intermediate portion of the cutting tool 51 in the axis direction is not illustrated in FIG. 5(b).

An outline configuration of the cutting tool 51 will be described with reference to FIG. 5. As shown in FIG. 5, the cutting tool 51 mainly includes the body 2, a hole portion 53 that is open in the tip end surface 2a of the body 2, a wall portion 54 that is formed of the hole portion 53 and the outer circumferential surface 2b of the body 2, notch portions 55 each of that is notched from the tip end surface 2a of the wall portion 54 and is communicated with the hole portion 53, and blade portions 56 each of that is held at a portion where the notch portion 55 intersects with the tip end surface 2a of the wall portion 54. In the embodiment, each of the blade portions 56 is configured by a tip, and is jointed to the body 2 by brazing.

The body 2 includes the hole portion 53 that is open in the tip end surface 2a. In the embodiment, the contour of the cross-sectional surface of the hole portion 53 is formed in a substantially circular shape in the cross-sectional surface perpendicular to the axis of the body 2. The axis line c of the hole portion 53 matches the axis center O of the body 2, and the hole portion 53 is formed concentrically with the body 2. Further, the hole portion 53 is the same in diameter from the tip end surface 2a of the body 2 to the rear end, and penetrates in parallel with the axis center O.

The notch portions 55 are formed with the same opening widths at equal intervals while being notched in predetermined lengths in the axis direction from three points of the tip end surface 2a of the wall portion 54. The blade portions 56 (tips) are held at portions (three points) where the notch portions 55 intersect with the tip end surface 2a of the wall portion 54.

Each of the blade portions 56 mainly includes a bottom blade 56a that is formed at a tip end in the direction of the axis center O, and an inner side surface 56h that passes through an inner end portion 56e (see FIG. 5(c)) of the bottom blade 56a and intersects with a rake surface 56f through a ridge line 56g. Further, each of the blade portions 56 includes an outer circumferential blade 56c that intersects with the bottom blade 56a through an outer circumferential corner 56b as shown in FIG. 5(c). The inner end portion 56e of the bottom blade 56a is configured to protrude from the contour of the hole portion 53 towards the inside (the side of the axis center O) as shown in FIG. 5(a). The ridge line 56g (see FIG. 5(c)) between the inner side surface 56h and the rake surface 56f of the blade portion 56 is inclined to depart from a line u in parallel with the axis center O passing through the inner end portion 56e of the blade portion 56, as the ridge line 56g is directed from the tip end surface 2a of the body 2 towards the rear end side, as shown in FIG. 5(d).

Here, the rotation of the cutting tool 51 about the axis center O allows the bottom blade 56a to cut the target surface and to hollow the target member in a cylindrical shape. The hollowed target member is in a cylindrical shape having a cylindrical side surface along the axis center O with a cylindrical bottom surface of the rotational trajectory of the inner end portion 56e of the bottom blade 56a. The cylindrical side surface includes the line u in parallel with the axis center O that passes through the inner end portion 56e of the bottom blade 56a. In the cutting tool 51, The ridge line 56g between the inner side surface 56h and the rake surface 56f of the blade portion 56 is inclined to depart from the line u in parallel with the axis center O passing through the inner end portion 56e of the bottom blade 56a, as the ridge line 56g is directed from the tip end surface 2a of the body 2 towards the rear end side. Thus, the clearance is provided in the axis direction by the inclination to easily discharge the chips. Accordingly, the chip packing can be prevented in the cutting tool 51.

Further, the notch portions 55 are formed at three points, and the blade portions 56 are held at respective portions where the notch portions 55 intersect with the tip end surface 2a of the wall portion 54. Thus, if plural blades are provided, the feeding speed per one blade can be made low as long as the cutting speed and the feeding speed are the same, and the roughness of the surface can be improved. Accordingly, the delamination can be prevented from being generated in fiber reinforcing composite materials such as a CFRP. Further, the eccentricity and the chatter vibration during the cutting process can be prevented, the diameter of the hole of the target member can be prevented from being increased, and the cutting tool 51 can be prevented from being broken.

It should be noted that an inclined angle $\theta 5$ of the ridge line 56g relative to the line u can be appropriately set in a range of 2° to 10°. By setting the inclined angle $\theta 5$ in a range of 2° to 10°, the chip packing can be prevented by appropriately providing the clearance, and the strength of the blade edge can be secured. As the inclined angle $\theta 5$ becomes smaller than 2°, the clearance is made small, and the chip packing tends to possibly occur. As the inclined angle $\theta 5$ becomes larger than 10°, the strength of the blade edge is reduced and the life of the tool tends to be reduced.

Further, the flank angle of the flank surface 56d (see FIG. 5(c)) of the blade portion 56 is preferably set at 2° to 10°. Accordingly, the abrasion of the flank surface can be reduced and the strength of the blade edge can be secured. It should be noted that as the flank angle becomes smaller than 2°, the abrasion of the flank surface tends to be increased. As the flank angle becomes larger than 10°, the strength of the blade edge is reduced, and the bottom blade 6a tends to be possibly broken.

Next, an endurance test that was conducted using the cutting tool 1 configured as described above will be described. The endurance test is a test in which when the target member is hollowed by the cutting tool 1 under predetermined conditions, the total number of through-holes that can be continuously processed is measured without generating the delamination on inner walls of the holes. The test was conducted using the cutting tool 1 (hereinafter, referred to as a "product of the present invention") described in the first embodiment and a cutting tool (hereinafter, referred to as a "conventional product") including a hole portion that was hollowed concentrically with the body 2 and whose axis line c matched the axis center O of the body 2, instead of the eccentric hole portion 3 of the cutting tool 1.

In the product of the present invention, the outer diameter of the body 2 was 6.35 mm, the inner diameter of the hole portion 3 was 5.175 mm, the deviation amount (eccentric amount) between the axis line c of the hole portion 3 and the axis center O of the body 2 was 0.3 mm, and the center angle $\theta 2$ relative to the wall portion 4 was 240°. However, the conventional product was configured as similar to the product of the present invention except that the eccentric amount was 0. Further, a CFRP (carbon fiber reinforced plastic) with a thickness of 19 mm was used for the target member, a machine used was a solid machining center, and an emulsion cutting oil was used in the product of the present invention and the conventional product, and the test was conducted under the conditions where the cutting speed and the feeding speed were the same.

The result of the endurance test for the product of the present invention shows that even if the number of processing holes reached 1000, the delamination was not occurred in the target member, and the cutting process could be continued. On the other hand, the conventional product was broken when the first hole was processed, and the cutting process could not be continued. It can be speculated that because the chips generated during the cutting process were not smoothly discharged in the conventional product, the chips were accordingly stuck in the vicinity of the blade portion in the hole portion of the cutting tool, the cutting resistance was increased, and thus the cutting tool was broken. In contrast, since the clearance was provided in the direction opposite to the rotational direction in the product of the present invention, the chip packing could be prevented. As a result, it can be speculated that the product of the present invention could be prevented from being broken by reducing the cutting resistance, and the delamination could be prevented.

Next, there will be shown the result of another endurance test conducted under the same conditions as described above while changing the eccentric amount of the product of the present invention. The configurations other than the eccentric amount were the same as those of the product of the present invention. When the eccentric amount was changed to 0.01 mm, 0.05 mm, 0.1 mm, 0.2 mm, 0.3 mm, 0.4 mm, 0.5 mm, and 0.58 mm, the cutting tool was broken when the first hole was processed in the case of an eccentric amount of 0.58 mm, and the cutting process could not be continued. In contrast, when the eccentric amount was changed to 0.01 mm, 0.05 mm, 0.1 mm, 0.2 mm, 0.3 mm, 0.4 mm, and 0.5 mm, the delamination was not occurred in the target member by the cutting tool even when the number of the processing holes reached 50, and the cutting process could be continued. It can be speculated that because as the eccentric amount became larger, the thickness of the wall portion 4 on the eccentric side was made small, the mechanical strength of the wall portion 4 was reduced, and the wall portion 4 was broken.

Next, there will be shown the result of still another endurance test conducted under the same conditions as described above while changing the center angle θ2 relative to the wall portion 4 of the product of the present invention. The configurations other than the center angle θ2 were the same as those of the product of the present invention. When the center angle θ2 relative to the wall portion 4 was changed to 270°, 240°, 210°, 180°, 150°, 120°, 90, and 60°, the cutting tool was broken when the second hole was processed in the case of a center angle of 60°, and the cutting process could not be continued. In contrast, when the center angle θ2 was changed to 270°, 240°, 210°, 180°, 150°, 120°, and 90°, the delamination was not occurred in the target member by the cutting tool even when the number of the processing holes reached 50, and the cutting process could be continued. It can be speculated that because as the center angle θ2 relative to the wall portion 4 became shorter, the centrality was reduced to increase the cutting resistance, and the cutting tool became susceptible to breakage due to the reduced mechanical strength of the wall portion 4.

It should be noted that in the same endurance test conducted for the cutting tool 51 described in the sixth embodiment, even when the number of the processing holes reached 1000, the cutting process could be continued without generating the delamination in the target member. It can be speculated that since the clearance was provided in the cutting tool 51 in the axis direction, the chip packing could be prevented, the cutting tool 51 could be accordingly prevented from being broken by reducing the cutting resistance, and the delamination could be prevented.

The present invention has been described above on the basis of the embodiments. However, it can be easily speculated that the present invention is not limited to the above-described embodiments, but may be variously changed and modified in a range without departing from the gist of the present invention. For example, it is obvious that numerical values (for example, the number or dimensions of constituent elements) mentioned in the above-described embodiments are merely examples, and other numerical values may be employed.

In the first embodiment, there has been described a case in that the cutting tool 1 is configured as a solid type in that the blade portion 6 and the shank 7 are formed integrally with the body 2. However, the present invention is not necessarily limited to this, but may be applied to other types. For example, the present invention may be applied to a cutting tool of a type in that a blade portion (tip) is jointed to a body by brazing, a blade edge-exchangeable slow away type, or a type in that a body and a shank are separately formed to be jointed to each other by fastening or soldering.

In the first embodiment, there has been described a case in that the back taper 2c is formed on the outer circumferential surface 2b of the body 2 and the clearance is provided in the feeding direction. However, the present invention is not necessarily limited to this. In stead of the back taper 2c, the clearance may be provided in the direction opposite to the rotational direction of the outer circumferential surface 2b of the body 2.

In the above-described embodiments, there has been described a case in which the contour of the cross-sectional surface of each of the hole portions 3, 33, 43, and 53 is in a circular shape when viewed from the tip end direction. However, the present invention is not necessarily limited to this, but may be formed in other shapes. The other shapes include, for example, an oval shape, a long circular shape, and a polygonal shape. The chips can be accommodated even in these hole portions, and thus the same effects can be obtained.

In the above-described embodiments, a surface process in which carbide, nitride, or oxide is chemically or physically attached to the surface of the blade portion, or a coating process can be performed.

In the sixth embodiment, there has been described a case in which the blade portions 56 are configured as tips. However, the present invention is not necessarily limited to this, but the blade portions 56 can be formed integrally with the body 2. Further, there has been described a case in which the blade portions 56 are held at three points of the body 2. However, the present invention is not necessarily limited to this, but the blade portions 56 may be held at one or two points of the body 2.

REFERENCE SIGNS LIST 1, 11, 21, 31, 41, 51 cutting tool
2 body
2a tip end surface
2b outer circumferential surface
3, 33, 43, 53 hole portion
4, 14, 24, 54 wall portion
5, 15, 25, 55 notch portion
6, 16, 26, 56 blade portion
6a, 16a, 26a, 56a bottom blade
6e, 16e, 26e, 56e inner end portion
6f, 56f rake surface
6g, 56g ridge line
6h, 56h inner side surface
6b, 26b, 56b outer circumferential corner
6c, 36c, 46c, 56c outer circumferential blade
c axis line
O axis center
r rotational trajectory

The invention claimed is:
1. A cutting tool comprising:
a body that rotates about an axis center;
a hole portion that is open in a tip end surface of the body;
a wall portion that is formed of the hole portion and an outer circumferential surface of the body;
a notch portion that is notched from the tip end surface of the wall portion and is communicated with the hole portion; and
a blade portion that is formed or held at a portion where the notch portion intersects with the tip end surface of the wall portion, wherein:
the blade portion includes a bottom blade formed at a tip end in a direction of axis center, and an inner side surface that passes through an inner end portion of the bottom blade and intersects with a rake surface through a ridge line;

the inner side surface is inclined so that a distance between the inner side surface and the axis center is increased towards a direction opposite to a rotational direction of the body;

the hole portion is centered by an axis line which is deviated from the axis center of the body;

the blade portion is formed or held at the thickest portion of the wall portion;

a center angle relative to the wall portion is set in a range from 180° to 270°; and when the notch portion is indented starting from the thickest portion of the wall portion, the end of the notch portion is formed in a direction from the outer circumferential surface of the body to a position where an imaginary line passing through the axis center and the axis line intersects with an inner circumferential surface of the hole portion.

2. The cutting tool according to claim 1, wherein each of the blade portions includes an outer circumferential blade that intersects with the bottom blade through an outer circumferential corner.

3. A cutting tool comprising:

a body that rotates about an axis center;

a hole portion that is open in a tip end surface of the body;

a wall portion that is formed of the hole portion and an outer circumferential surface of the body;

a notch portion that is notched from the tip end surface of the wall portion and is communicated with the hole portion; and a blade portion that is formed or held at a portion where the notch portion intersects with the tip end surface of the wall portion, wherein:

the blade portion includes a bottom blade formed at a tip end in the axis center direction, and an inner side surface that passes through an inner end portion of the bottom blade and intersects with a rake surface through a ridge line;

the inner side surface is inclined so that a distance between the inner side surface and the axis center is increased towards a direction opposite to a rotational direction of the body;

the axis center of the body is deviated from an axis line of the hole portion;

the blade portion is formed or held at the thickest portion of the wall portion;

a center angle relative to the wall portion is set in a range from 90° to 180°; and when the notch portion is indented starting from the thickest portion of the wall portion, the end of the notch portion is formed in a direction from the outer circumferential surface of the body to the axis center.

4. The cutting tool according to claim 3, wherein each of the blade portions includes an outer circumferential blade that intersects with the bottom blade through an outer circumferential corner.

* * * * *